Jan. 4, 1949.    R. E. PETERSON    2,458,415
APPARATUS FOR ECHO DISTANCE MEASUREMENT
Original Filed Aug. 19, 1942    2 Sheets-Sheet 2

INVENTOR
ROBERT E. PETERSON
BY
ATTORNEY

Patented Jan. 4, 1949

2,458,415

UNITED STATES PATENT OFFICE 2,458,415

APPARATUS FOR ECHO DISTANCE MEASUREMENT

Robert E. Peterson, Danvers, Mass., assignor to Submarine Signal Company, Boston, Mass., a corporation of Delaware Continuation of application Serial No. 455,391, August 19, 1942. This application October 22, 1947, Serial No. 781,329

6 Claims. (Cl. 177—386)

This is a continuation of my copending application, Serial No. 455,391, filed August 19, 1942, and forfeited.

The present invention relates to a distance measuring system which measures the distance as a function of the time of travel of a wave in the medium from the transmitting station to the reflecting object and return.

The present invention is more particularly associated with distance and depth measurement in connection with submarine acoustic apparatus and finds its application in measurements by the use of compressional wave vibrations in the sonic and supersonic range in which a single unit is used for sending and receiving.

The invention finds its principal merit in the measurement of shallow depths and short distances.

Principally in the use of sound waves, both sonic and supersonic for distance measurement, difficulty has been experienced in measuring the short distances. Where the transmitting and pickup unit is the same element, either the sending and receiving circuits must both be permanently connected to the same unit, in which case special means must be employed to prevent the transmittted signal from affecting the receiving circuit, or a switch element must be employed to switch from sending to receiving directly after the signal is sent out. In the past such switching from sending to receiving has itself affected the receiving circuit and delayed the full recovery of the receiving circuit so as not to permit its proper and complete operation.

One of the principal objects of the present invention is to provide a switch-transfer system so that the transfer from sending to receiving and from receiving to sending can be quietly and efficiently effected at the desired moment in the cycle of operation of the indicator system. This system is particularly useful for shallow depth sounding and ranging apparatus employing supersonic transmitters and receivers of the magnetostrictive or other supersonic types and permits distance measurement to a fraction of a fathom using a single unit for sending and receiving.

Figure 1:
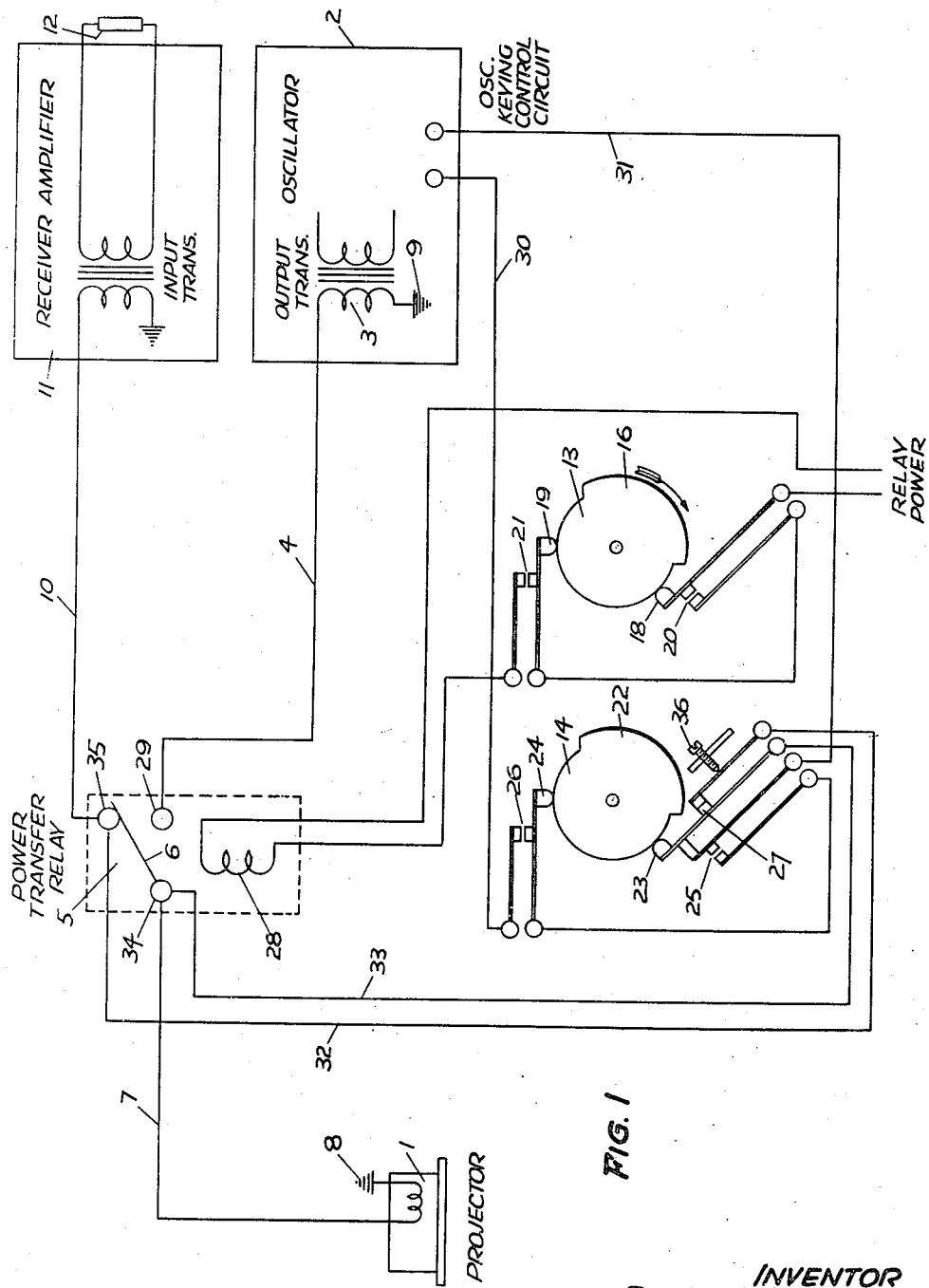
Figure 2:
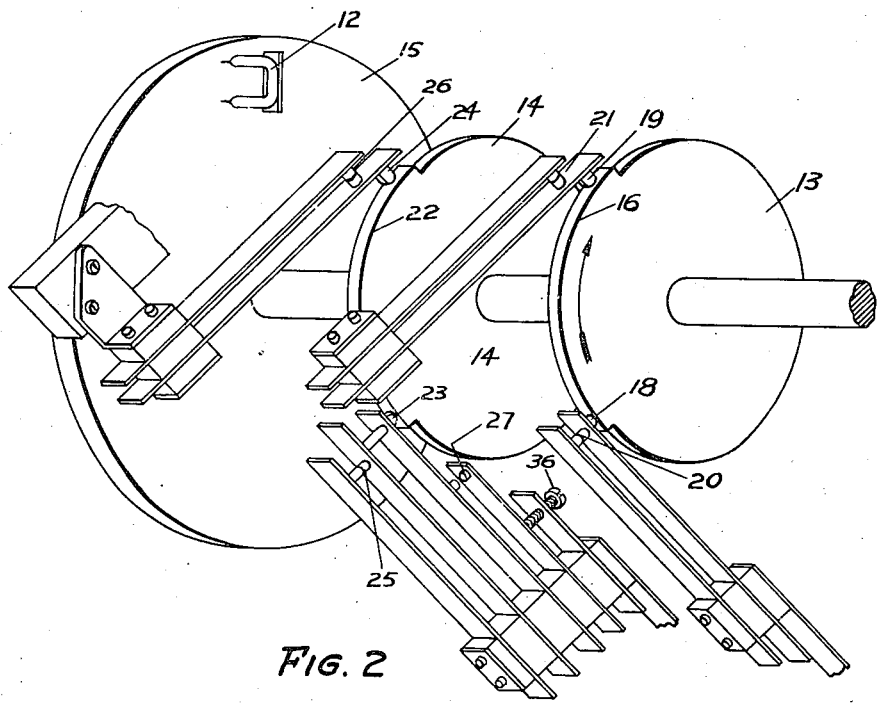
Figure 3:
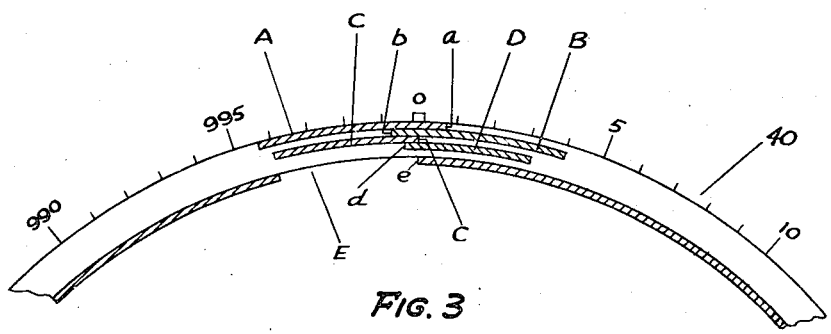

Without further describing the merits and advantages of the present invention, the invention will be described in connection with the drawings, in which Fig. 1 shows a diagrammatic layout of the system; Fig. 2 shows a perspective of a detail of the invention; and Fig. 3 illustrates the timing cycles in connection with the switching arrangement illustrated in the other figures.

In Fig. 1, I represents a projector which may be used face downward in the water for depth soundings or may have its face in a vertical plane and be rotated for sound ranging, the position of the unit being immaterial to the nature of the present invention. The transmitting signal is produced in the projector I through energy supplied by the oscillator 2 through the output transformer 3 over the line 4, the power-transfer relay 5 when the switch 6 is in the lower position and the line 7 to the projector I. This connection may be a double line or, as illustrated in the figure, the projector and the oscillator may be provided with ground returns 8 and 9. The receiving circuit uses the propector I as the pickup unit from which the energy is conducted over the line 7 which connects with the line 10 either through the power-transfer relay 5 or the cam-switching arrangement, the operation of which will be explained below. The line 10 connects to the receiver amplifier 11 which operates the indicator 12 (Fig. 2) which may be of the discharge tube type. The cams 13 and 14 are diagrammatically shown in Fig. 1, and in Fig. 2 they are shown in perspective on the same shaft as the disc 15 carrying the indicator 12. The cam 13 is provided with a peripheral projection 16 which rides successively under the projections 18 and 19 of the switch contacts 20 and 21, respectively, first closing the contact 20 and then closing the contact 21. The cam 14 is also provided with a peripheral projection 22 which as it rides under the projections 23 and 24 closes the switch contacts 25 and 26, respectively, in the order set forth. As the projection 23 is moved outward on the cam, the contact 27 begins to open. The cam 13 with its associated contacts 20 and 21 control the energization of the coil 28 of the power-transfer relay. The two switch contacts 20 and 21 are connected in series with the coil 28 across the power supply, not shown, so that the coil 28 is only energized while both contacts 20 and 21 are closed. This, it will be seen, will occur for only the short time interval dependent upon the speed of the cam, length of arc covered by 16 and angular spacing of projections 18 and 19, which factors determine the interval in which the two contacts 20 and 21 are simultaneously maintained closed.

When the coil 28 is energized, the switch contact arm 6 is drawn downward until the arm makes contact with the switch post 29, completing the power circuit from the oscillator to the projector over the line 4 and the line 7. The projector is then in a position to be keyed through the keying control circuit which is connected to the oscillator by means of the lines 30 and 31. Keying of this circuit occurs during the interval that both switch contacts 25 and 26 are closed since both of these contacts are in series with the lines 30 and 31. The switch 6 is closed just prior to the keying of the oscillator and remains closed for a short interval after keying. This will be explained below in connection with Fig. 3.

As the projection 22 on the cam 14 begins to close the contact 25, it opens the contact 27 which is connected by the lines 32 and 33 to the contact posts 34 and 35, respectively, in the power-transfer relay 5. The opening of contact 27 does not disconnect the receiving circuit from the projector since this occurs prior to the energizing of the coil 28 and the pulling down of switch 6, the operation of which transfers from receiving to sending. The release of the projection 23 ends the transmitting keying interval and completes the contact 27, closing the circuit between the posts 34 and 35 in the power-transfer relay over the lines 32 and 33, thus completing the receiving circuit from the projector through the cable 7, the lines 32 and 33, the switch 27 to the line 10 and the receiver amplifier 11. The switch 27 is closed prior to the release of the switch arm 6 and this adjustment may be accurately regulated by means of the set screw 36 for adjusting one contact of the pair of contacts 27. In the sequence of the opening of these various contacts, the contact 27 is opened prior to the operation of the coil 28 which pulls the switch arm 6 from a receiving to a sending position.

The sequence of operation is illustrated in the diagrammatic sketch of Fig. 3 showing the operation of the switching system in association with the measuring scale which is positioned in front of the indicator disc. The moment of transmission occurs when the indicator 12 comes to the zero marking on the scale 40. During the interval indicated by the sectioned arc A, the contact 20 for operating the power-transfer relay remains closed. During the interval indicated by the sectioned arc B, the contact 21 remains closed so that the overlapping portions between the ends $b$ and $a$ is the time interval during which the power-transfer relay holds the arm 6 in a sending position. In a similar fashion the transmitter keying is produced when the contacts 25 and 26 remain closed. The sectioned arc marked by C in Fig. 3 indicates the interval in which the switch 25 is closed and that marked by D indicates the interval in which the switch 26 is closed so that the overlapping interval $d, c$ which is spaced between the overlapping interval $b, a$ is the keying interval for the transmitter. The unsectioned arc E indicates the portion of the cycle in which the receiving keying contact, that is the contact 27, is opened. This, it will be remembered, occurs just prior to closing of the contact 25 and closes just after contact 25 is opened. During this interval marked by E, however, the receiving circuit still functions until the power-transfer relay 28 is operated which occurs approximately at the point marked by the line $b$, so that the interval in which the receiver does not function is that between the line $b$ and the line $e$, and during this time the transmitted signal as represented by the interval between $d, c$ is being sent out.

Having now described my invention, I claim:

1. In a system for distance measurement by the time-of-travel method, a single projecting and receiving unit, a source of projection power, a receiving circuit, transfer-switching means having a plurality of groups of switch contacts, a first of said groups of switch contacts connecting said source to said unit, a second of said groups of switch contacts connecting said receiving circuit to said unit, a keying circuit which energizes said source, a third of said groups of switch contacts completing said keying circuit, a distance indicator connected to the output of said receiving circuit and operating in a predetermined time sequence, said transfer-switching means also including operating means associated in operation with said indicator and operating said first group of switch contacts for a predetermined period, operating said third group of switch contacts during said period, and operating said second group of switch contacts just after the operation of said third group of switch contacts.

2. In a system for distance measurement by the time-of-travel method, a single projecting and receiving unit, a source of projection power, a receiving circuit, transfer-switching means having a plurality of groups of switch contacts, a first of said groups of switch contacts connecting said source to said unit, a second of said groups of switch contacts connecting said receiving circuit to said unit, a keying circuit which energizes said source, a third of said groups of switch contacts completing said keying circuit, a shunt connection across said second group of switch contacts having a normally closed switch contact therein, a distance indicator connected to the output of said receiving circuit and operating in a predetermined time sequence, said indicator having associated therewith cam-operated means, said plurality of groups of switch contacts being positioned to be operated by said cam-operated means, said first group of switch contacts being operated by said cam-operated means for a predetermined period, said third group of switch contacts being operated by said cam-operated means during said period, and said normally-closed switch contact being simultaneously disconnected by said cam-operated means, whereby the receiving circuit is disconnected from the unit for a time interval beginning just before to an instant just after the keying interval.

3. In a system for distance measurement by the time-of-travel method, a single projecting and receiving unit, a distance scale, a moving distance indicator operating in a predetermined time sequence which indicates distance with reference to said distance scale, a transmitter, a transfer relay switching means having a transmitting position in which it connects said transmitter to said unit, means operative in association with the moving indicator and holding said relay in said transmitting position overlapping a signal interval, a keying circuit which energizes said transmitter, keying-means operative in association with the moving indicator and completing said keying circuit during the signal interval, a circuit normally connecting said unit to said indicator, and means associated with said keying-means and opening said circuit prior to the keying of the transmitter and closing said circuit just subsequent thereto.

4. In a system for distance measurement by the time-of-travel method, a single projecting and receiving unit, a distance scale, a rotating distance indicator which indicates distance with reference to said distance scale, cam means rotated in association with said indicator, a sending circuit, a transfer relay switch connected to said unit and having a sending position and a receiving position, a transfer relay operating circuit, and a plurality of groups of switch-contact means operatively associated with said cam means, a first of said groups of switch contacts being series connected in said transfer relay circuit and operated by said cam means to operate said transfer relay to the sending position for a certain time interval, a second of said groups of switch contacts comprising two series connected sets of contacts arranged for sequential operation and completing said sending circuit when both sets of contacts are closed by said cam means, and a third of said groups of switch contacts in shunt connection across said receiving position, said third group of contacts being opened by said cam means simultaneously with the closing of the first set of said second group of contacts and being closed with the opening thereof, said second group of contacts completing their circuit during said time interval.

5. In a system for distance measurement by the time-of-travel method, a single projecting and receiving unit, a source of projection power, a receiving circuit, a distance indicator connected to the output of said receiving circuit and operating in a predetermined time sequence, a plurality of groups of switch contacts, a first of said groups of switch contacts connecting said source to said unit, a second of said groups of switch contacts connecting said receiving circuit to said unit, a keying circuit which energizes said source, a third of said groups of contacts completing said keying circuit, means associated in operation with said distance indicator and operating said first group of switch contacts for a certain period, operating said third group of switch contacts during said period, and operating said second group of switch contacts just after the operation of said third group of switch contacts.

6. In a system for distance measurement by the time-of-travel method, a single projecting and receiving unit, a source of projection power, a receiving circuit, a distance indicator connected to the output of said receiving circuit and operating in a predetermined time sequence, a plurality of groups of switch contacts, a first of said groups of switch contacts connecting said source to said unit, a second of said groups of switch contacts connecting said receiving circuit to said unit, a keying circuit which energizes said source, a third of said groups of contacts completing said keying circuit, rotatable switch operator means operatively connected with said indicator and operating said first group of switch contacts for a certain period, operating said third group of switch contacts during said period, and operating said second group of switch contacts just after the operation of said third group of switch contacts.

ROBERT E. PETERSON.

REFERENCES CITED

The following references are of record in the file of this patent:

UNITED STATES PATENTS

| Number | Name | Date |
| --- | --- | --- |
| 1,885,652 | Touhy | Nov. 1, 1932 |
| 2,410,066 | Harrison | Oct. 29, 1946 |